United States Patent Office 3,649,675
Patented Mar. 14, 1972

3,649,675
PREPARATION OF BENZYL AND ALLYL
ALKANOYLOXY COMPOUNDS
William J. Koehl, Jr., Yardley, Pa., assignor to
Mobil Oil Corporation
No Drawing. Filed May 23, 1967, Ser. No. 640,500
Int. Cl. C07c 67/04
U.S. Cl. 260—488 CD                    11 Claims

ABSTRACT OF THE DISCLOSURE

A method for the preparation of derivatives of benzylic and allylic compounds in the presence of a metal compound which is an oxidizing agent. The preferred oxidizing agent comprises a cobaltic ion, and the major products obtained are acyloxy derivatives. For example, the reaction of toluene with a cobaltic acetate solution yields benzyl acetate as the major compound.

BACKGROUND

The electrochemical acyloxylation of benzylic and allylic compounds in the presence of cobalt is disclosed in copending patent applications S.N. 605,225 and S.N. 606,520, each filed on Dec. 28, 1966 by this applicant. A non-electrochemical acetoxylation is disclosed in Pat. No. 3,228,971. In this patent peracetic acid, with a minor amount of a cobalt and copper compounds, is used in acetoxylation reactions.

THE INVENTION

This invention is directed to the reaction of benzylic or allylic compounds with a metal compound. In particular, the acyloxylation of these compounds produces the corresponding esters with a high degree of selectivity. This is accomplished by reacting the benzylic or allylic compound with a metal promoter in the presence of an acyloxy compound. For example, in the acyloxylation of toluene or 1-octene a cobaltic acetate solution is used which comprises the oxidizing agent, cobaltic acetate, an added acyloxy compound, such as potassium acetate to increase concentration of acetate ions, and/or a solvent, acetic acid. The hydrocarbon compounds useful in this invention may be selected from the group consisting of

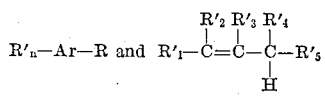

wherein Ar represents a substituted benzene or condensed ring aromatics such as naphthalenes, or heterocyclics, such as furan, R is a low molecular weight alkyl substituent having 1 to 12 carbon atoms, $n$ is an integer from 1 to 5 and R' is a substituent selected from the class consisting of hydrogen H—, alkyl R—, mononuclear aryl Ar'—, alkoxy RO—, phenoxy PhO, acyloxy R"COO—, halogen, such as chlorine, cyano NC—, carboxy R"OOC, and acylamido R"CONH— groups, wherein R is as defined above. The preferred substituents for R and R' are alkyl groups having up to about 10 or 12 carbons, and preferably up to 6 or 4 carbons, and comprising straight or branched chain radicals. The mononuclear aryl groups are radicals like phenyl, tolyl, and the like. The R" radical may be alkyl, substituted alkyl, phenyl, or substituted phenyl, and the number of carbons in the alkyl or substituted alkyl groups may be as described above. In all of the foregoing substituents, the substituent itself may have a substituting group of the kind described, i.e., an alkyl, mononuclear aryl, alkoxy, phenoxy, acyloxy, or acylamido group.

The groups $R'_1$, $R'_2$, $R'_3$, $R'_4$ and $R'_5$ may be the same or different or may form a ring compound, and may be selected from the groups of substituents defined for R'.

The specific compounds that may be converted to acyloxy derivatives include such alkyl benzenes as toluene, the xylenes, hemimellitene, pseudocumene, mesitylene, prehnitene, durene, isodurene, pentamethylbenzene, hexamethylbenzene, ethylbenzene, the various diethylbenzenes and polyethylbenzenes, propylbenzene, cumene, cymene, butylbenzene, etc., also alkylbenzenes with substituted alkyl side chains like (2-methoxyethyl)benzene; and tolylbenzene; also alkoxyalkylbenzenes such as p-tolyl methyl ether; also acyloxyalkylbenzenes such as acetoxytoluenes; and acylamidoalkylbenzenes like acetotoluides. Suitable substituted corresponding naphthalenes and other condensed ring aromatics are also useful.

In more detail, the alkyl-substituted condensed ring aromatic compound includes compounds having only 6-membered rings, and also compounds having both 6- and 5-membered rings. Illustrative 6-membered ring compounds are the alkyl-substituted naphthalenes, acenaphthenes, anthracenes, phenanthrenes, preylenes, pyrenes, chrysenes, triphenylenes, pentacenes, fluoroanthrenes, and the like. Compounds having a 5-membered ring include the various alkyl-substituted indenes, hydrindenes, etc. Also suitable are compounds containing 5- and 6-membered rings in which a 6-membered ring may be heterocyclic, as in the alkyl-substituted quinolines, isoquinolines, dibenzofurans, dibenzopyridines, phenanthridines, phenanthrolines, phenazines; or in which a 5-membered ring may be heterocyclic, as in alkyl-substituted coumarones and thianaphthenes, etc. Other alkyl-substituted compounds are those containing the cyclopentanophenanthrene nucleus.

Suitable heterocyclic substituents represented by Ar may be obtained from five and six membered rings containing one or more hetero-atoms, such as oxygen, nitrogen and sulfur. Illustrative compounds are furan, pyran, thiophene, and pyrrole.

Other specific compounds that may be converted to acyloxy derivatives include propene, isobutene, 1-octene, and other straight and branched chain olefins having the formula $C_xH_{2x}$, wherein $x$ is from at least 3 to 20 and preferably 3 to 10. Where $R_1$ and $R_4$ form a ring compound, together they may be represented by the formula —$C_xH^-_{2x}$, wherein $x$ is an integer from 1 to 5 and larger; a specific example is cyclohexene.

Still other specific compounds that may be converted to acyloxy derivatives include allyl benzene, 1,1-diphenyl propene, allyl ethyl ether, allyl phenyl ether allyl acetate, 4-chloro-1-butene, allyl cyanide, methyl α-crotonate and N-allylacetamide. This listing is illustrative of compounds within the generic groupings given above. Of course, other suitable compounds include those similar to the specific compounds listed, for example, the $C_3$ olefinic substituents above may instead be $C_4$ to $C_8$ and larger olefinics, straight- or branch-chain.

The preferred class of solvents are alkanoic acids having from 1 to 10 carbon atoms, and particularly the C–2 to C–6 acids such as acetic, propionic, butanoic and pentonic and their isomers and various hexanoic acids. Branched as well as straight chain acids are useful including such acids as 2-methylbutyric, 3-methylbutyric and tri-methylacetic. Other useful solvents are acetonitrile and dimethylformamide. In general any solvent or solvent mixture may be used which dissolves the reactants and which does not itself interfere with the desired reaction.

The preferred group of acyloxy compounds are those which correspond to salts of the above alkanoic acids (although the alkanoic acids themselves may be used without their salts). The particular salt of an alkanoic acid may be the same or different from the alkanoic acid used as a solvent. The salt is usually the sodium or potassium salt, although lithium and quaternary ammonium salts are suitable. A high concentration of the acyloxy compound favors the preparation of acyloxy derivatives. The formation of aldehydes and ketones are favored without the added acyloxy compound.

Any suitably inert cobaltic salt may be used in this invention with or without the presence of a cobaltous salt. The cobaltic compound may be formed from any of the above alkanoic acids, the preferred promoter being cobaltic acetate. Examples of inorganic cobaltic salts are $Co(ClO_4)_3$, $Co_2(SO_4)_3$ and $Co(OH)_3$, the more soluble being preferred. These metals may also be used in the form of any soluble salt, inorganic or organic, such as the acetate or from other alkanoic acids. The cobaltic compounds may be prepared electrochemically, as described below, or by any of the other methods in the literature such as reaction of cobaltous acetate with peracetic acid or ozone. The cobaltic compound may be used alone or in the presence of a cobaltous compound.

The invention may be illustrated by the following examples.

Cobaltic acetate was prepared in acetic acid by electrochemical oxidation. The anolyte was a solution of 42 g. of cobaltous acetate ($Co(C_2H_3O_2)_2 \cdot 4H_2O$) and 60 g. of potassium acetate in acetic acid so that the final volume of the solution was 400 ml. The catholyte was a solution of 35 g. of potassium acetate in 200 ml. of acetic acid. The anode was platinum, the cathode was copper; the anode and cathode compartments were separated by a porous clay plate. Electrolysis was run until about 80% of the cobaltous ion was converted to cobaltic. The anolyte solution was then about 0.35 N in cobaltic acetate. This solution was used in the following examples with no further treatment. The composition range of a solution to be electrolyzed may vary widely, suitable ratios being well known in the art.

EXAMPLE 1

Toluene, 10 ml. was added to 70 ml. of the cobaltic acetate solution .35 N, and heated at 37° C. for 43 hours. The mixture was diluted with water and extracted with ether. The extract was analyzed by vapor phase chromatography. Benzyl acetate was found in 61% yield based on cobaltic acetate consumed. (The yields in the following examples are also given in terms of cobaltic acetate consumed.) Benzaldehyde was found in 29% yield, and bibenzyl in 4% yield. Forty-eight percent of the cobaltic salt was consumed.

An identical mixture was heated at reflux for 50 minutes, worked up and analyzed in the same way. The yields of benzyl acetate and benzaldehyde were 41% and 24%. One hundred percent of the cobaltic salt was consumed in this and all of the following examples carried out at reflux temperatures.

EXAMPLE 2

1-methylnaphthalene, 5.0 g. and 50 ml. of the cobaltic acetate solution were heated at 37° C. for 43 hours. 1-naphthalene methyl acetate was obtained in 34% yield and 1-naphthaldehyde in 17% yield. No 4-methyl-1-naphthalene acetate was produced. Sixty-three percent of the cobaltic salts was consumed.

A mixture of 4.0 g. of 1-methylnaphthalene and 40 ml. of the cobaltic acetate solution heated at reflux for 15 minutes yielded 26% of the acetate and 16% of the aldehyde.

Using the procedure of Example 1 of Ser. No. 605,225, a mixture of 20 grams of 1-methylnaphthalene, 120 ml. of glacial acetic acid, 2.0 ml. of water, 20 ml. of toluene, 5 grams of cobaltous acetate and 20 grams of potassium acetate was electrolyzed for 6 hours with .25 amp. at 6.9 volts and 34° C. 4-methyl-1-naphthyl acetate and 1-naphthalene methyl acetate were obtained, in a ratio of about 2:1, with a current efficiency of 43%.

EXAMPLE 3

2-methylnaphthalene, 5.3 g., and 50 ml. of cobaltic acetate solution heated at reflux for 10 minutes yielded 29% of 2-naphthalene methyl acetate, 12% of 2-methyl-1-naphthyl acetate, and 17% of 2-naphthaldehyde.

Using the procedure for Example 1 of Ser. No. 605,225, a mixture of 15 grams of 2-methylnapthalene, 120 ml. of glacial acetic acid, 2.0 ml. of water, 20 ml. of toluene, 5 grams of cobaltous acetate, and 20 grams of potassium acetate were electrolyzed for 6 hours with .25 amp. at 6.9 volts and 34° C. 2-methyl-1-naphthyl acetate was obtained with a current efficiency of 57%.

Examples 2 and 3 indicate particular distinctions between the present process and the electrochemical method. Compounds such as the methylnaphthalenes which are oxidized more readily than cobaltous acetate in the electrochemical process yield ring acetates. These same compounds when treated with cobaltic acetate in acetic acid yield benzylic acetates.

EXAMPLE 4 o-Methylanisole, 5.0 g., and 50 ml. of the cobaltic acetate solution heated at 37° C. for 43 hours yielded 25% of o-methoxybenzyl acetate and 27% of o-methoxybenzaldehyde. Fifty-five percent of the cobaltic salt was consumed.

EXAMPLE 5 m-Methylanisole, 4.0 g., and 50 ml. of the cobaltic acetate solution heated at reflux for 15 minutes gave as the major product m-methoxybenzyl acetate in 20% yield based on cobaltic acetate and m-methoxybenzaldehyde in 5% yield. (Ring acetates were obtained by the electrochemical method.)

EXAMPLE 6

1-octene, 10 g., and 50 ml. of the cobaltic acetate solution were mixed and heated at reflux for 30 minutes. The mixture was worked up and analyzed as described in Example 1. The isomeric allylic acetates were found: 3-acetoxy-1-octene in 5% yield and 1-acetoxy-2-octene in 12% yield.

EXAMPLE 7

The procedure of Example 1 was repeated, at 110° C., with cyclohexene in place of toluene. The products obtained were: 7% 2-cyclohexen-1-yl acetate, 33% 2-cyclohexen-1-ol and 44% 2-cyclohexene-1-one.

EXAMPLE 8

3.0 g. of p-methyl benzyl acetate, 10 g. of potassium acetate, 7 g. of solid cobaltic acetate (60% $Co(OAc)_3$) plus 50 ml. of acetic acid were heated at 70° for 15 hr. p-xylylene diacetate was the major product in 14% yield.

The reaction temperatures in this invention may range from ambient to reflux temperature. Yields are highest at the low end of the range but reaction times are longer. Reflux temperatures increase the speed of reaction at the expense of yields.

The composition range of the reaction mixture may vary widely, suitable ratios, in moles, are reactants (benzylic or allylic compound) 1:cobaltic compound .1–10, preferably 1–3. In terms of parts by weight per part of cobaltic compound, added acyloxy compound, 0–20, preferably saturated for acyloxy substitution, and solvent 5–100.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

In light of the foregoing description, the following is claimed.

What is claimed is:

1. A method which comprises reacting a mixture consisting essentially of a solution of a cobaltic compound of an alkanoic acid having from 1 to 10 carbon atoms per molecule and an acyloxy compound selected from the group consisting of an alkanoic acid having from 1 to 10 carbon atoms per molecule and a sodium, potassium, lithium or quaternary ammonium salt thereof, and an organic compound selected from the group consisting of compounds defined by the following formula:

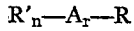

wherein $A_r$ is an aromatic hydrocarbyl group, R is a low molecular weight alkyl substituent having 1–12 carbon atoms, n is an integer from 1 to 5, and R' is a substituent selected from the group consisting of hydrogen H—, alkyl R—, alkoxy RO—, and —$CH_2COOCH_3$ groups, wherein R is as defined above, a straight or branched olefinic hydrocarbon having from 3 to 10 carbon atoms per molecule and a cycloolefinic hydrocarbon having from 4 to 18 carbon atoms per molecule.

2. The process of claim 1 wherein said cobaltic compound is an alkanoic acid salt.

3. The process of claim 1 wherein said acyloxy compound is an alkanoic acid having 1 to 10 carbon atoms.

4. The process of claim 3 wherein said alkanoic acid is acetic acid.

5. The process of claim 1 wherein the acyloxy compound is a salt of an alkanoic acid having 1 to 10 carbon atoms.

6. The process of claim 5 wherein said alkanoic acid is acetic acid.

7. The process of claim 1 wherein the molar ratio of components is organic compound, 1:cobaltic promoter, 1–3.

8. The process of claim 1 wherein the cycloolefin is cyclohexene.

9. The process of claim 1 wherein the olefin is 1-octene.

10. The process of claim 1 wherein said organic compound (1) has the following formula

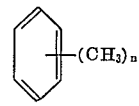

wherein n is from 1 to 3.

11. The process of claim 1 wherein said organic compound (1) is an alkyl-substituted benzene or naphthalene.

References Cited
UNITED STATES PATENTS

| | | | |
|---|---|---|---|
| 3,047,616 | 7/1962 | Blair et al. | 260—488 |
| 3,176,039 | 3/1965 | Hay | 260—497 |
| 3,228,971 | 1/1966 | MacLean | 260—488 |

LORRAINE A. WEINBERGER, Primary Examiner

V. GARNER, Assistant Examiner

U.S. Cl. X.R.

260—267, 287 R, 326.3, 332.2 R, 345.8, 346.2 R, 346.2 M, 465 D, 465.4, 473 F, 473 R, 479 R, 488 H, 490, 491, 497 R, 586 B, 599, 600, 670

PO-1050
(5/69)

UNITED STATES PATENT OFFICE
CERTIFICATE OF CORRECTION

Patent No. 3,649,675            Dated    March 14, 1972

Inventor(s)   William J. Koehl, Jr.

It is certified that error appears in the above-identified patent and that said Letters Patent are hereby corrected as shown below:

Column 2, line 19, change "preylenes" to --perylenes--

Column 5, line 18, change "18" to --8--

Signed and sealed this 11th day of July 1972.

(SEAL)
Attest:

EDWARD M. FLETCHER, JR.           ROBERT GOTTSCHALK
Attesting Officer                   Commissioner of Patents